(12) United States Patent
Marinier et al.

(10) Patent No.: US 7,561,546 B2
(45) Date of Patent: Jul. 14, 2009

(54) WIRELESS COMMUNICATION METHOD AND APPARATUS FOR MANAGING RADIO RESOURCES USING SILENT MEASUREMENT PERIODS

(75) Inventors: Paul Marinier, Brossard (CA); Christopher Cave, Candiac (CA); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 302 days.

(21) Appl. No.: 11/009,821

(22) Filed: Dec. 10, 2004

(65) Prior Publication Data

US 2005/0164724 A1 Jul. 28, 2005

Related U.S. Application Data

(60) Provisional application No. 60/535,020, filed on Jan. 8, 2004.

(51) Int. Cl.
*H04W 4/00* (2006.01)
(52) U.S. Cl. .................. 370/329; 370/431; 455/450
(58) Field of Classification Search .......... 370/310, 370/328, 342, 343, 315, 345, 329, 431; 455/450
See application file for complete search history.

(56) References Cited

U.S. PATENT DOCUMENTS 5,355,514 A 10/1994 Borg .................. 455/423
5,956,642 A 9/1999 Larsson et al. .......... 455/449
6,310,866 B1 10/2001 Kronestedt et al. ....... 370/330
2002/0176437 A1 11/2002 Busch et al.
2004/0267441 A1 12/2004 Kim
2005/0083962 A1* 4/2005 Khun-Jush et al. ....... 370/345 X
2005/0122919 A1 6/2005 Touag

FOREIGN PATENT DOCUMENTS

| JP | 2002-158667 | 5/2002 |
|----|-------------|--------|
| WO | 02/082844 | 3/2002 |
| WO | 03/026218 | 9/2002 |
| WO | 03/047290 | 6/2003 |

OTHER PUBLICATIONS

Kerry et al., "Liaison Statement on the Compatibility between IEEE 802.11a and Radars in the Radiolocation and Radionavigation Service in the 5250-5350 MHz and 5470-5725 MHz Bands," IEEE 802.11-01/081r2, 15/072-r1, XP-002180310, (Jan. 17, 2001).

* cited by examiner

*Primary Examiner*—Philip J Sobutka
(74) *Attorney, Agent, or Firm*—Volpe and Koenig, P.C.

(57) ABSTRACT

A silent measurement period (SMP) for a selected channel in an allowable channel set (ACS) of the access point (AP) is set. During the SMP, the AP does not serve wireless transmit/receive units (WTRUs) within its coverage area and reserves its channels for other BSSs. A normal operating channel of the AP is changed to the selected channel upon initialization of the SMP. Characteristics of the selected channel is measured during the SMP. The operating channel of the AP is changed back to the normal operating channel when the duration of the SMP expires.

12 Claims, 4 Drawing Sheets

US 7,561,546 B2

WIRELESS COMMUNICATION METHOD AND APPARATUS FOR MANAGING RADIO RESOURCES USING SILENT MEASUREMENT PERIODS

CROSS REFERENCE TO RELATED APPLICATIONS

This application claims priority from U.S. provisional application No. 60/535,020 filed on Jan. 8, 2004, which is incorporated by reference as if fully set forth.

FIELD OF INVENTION

The present invention relates to radio resource management (RRM) in a wireless communication system. More particularly, the present invention relates to radio resource management using silent measurement periods (SMPs) in a wireless communication system.

BACKGROUND

In a wireless communication system comprising a plurality of basic service sets (BSSs), an access point (AP) of a BSS is at times required to listen to data packets transmitted from neighboring BSSs. In addition, an AP may be required to measure the level of external interference in different channels for the purpose of supporting advanced RRM functions such as frequency selection, load balancing or power management. However, an AP must also support transmission and reception of packets to and from wireless transmit/receive units (WTRUs) in its own BSS. The frequency channel used by an AP to communicate with WTRUs in its own BSS may be different from any of the frequency channels used by neighboring BSSs, or from channels on which external interference is measured.

Due to cost limitations, many APs include only one receiver. As a result, it is not possible to simultaneously measure external interference or listen to packets transmitted from other BSSs on one frequency channel and communicate with WTRUs in the AP's own BSS when it is operating on a different frequency channel. Even if an AP's own BSS operates on the same frequency channel on which measurements are to be made, these measurements may be difficult to perform if the traffic in the AP's BSS is heavy.

Accordingly, it is desirable to have a mechanism by which an AP could measure external interference and packets transmitted from neighboring BSSs, including those operating on other frequency channels, with minimal disruption of the AP's communications with WTRUs in its own BSS.

SUMMARY

The present invention allows an AP to measure both interference and packets transmitted from other BSSs in order to efficiently manage radio resources in a wireless communication system that may include a plurality of BSSs. The AP serves a coverage area of one BSS. At a given time, an SMP for a selected channel in an allowable channel set (ACS) of the AP is triggered. The AP waits for the channel to become idle and then transmits an SMP notification message in order to restrict, (as much as possible), transmission of packets by WTRUs in its own BSS during the SMP.

During the SMP, the AP does not serve WTRUs within its coverage area in order to perform measurements on a selected channel. The operating frequency channel of a receiver in the AP is changed, (if necessary), to the selected channel upon the start of the SMP. Upon expiration of the SMP, the operating channel of the AP is switched back to the channel the AP used before the start of the SMP, (if different). A new SMP for another frequency channel in the ACS is then scheduled.

The SMP mechanism allows the AP to measure external interference and packets sent from other BSSs, while minimally disrupting communications with WTRUs associated with the AP.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "AP" includes but is not limited to an access point, a Node-B, a site controller, a base station or any other type of interfacing device in a wireless environment.

The features of the present invention may be incorporated into an integrated circuit (IC) or be configured in a circuit comprising a multitude of interconnecting components.

Figure 1:
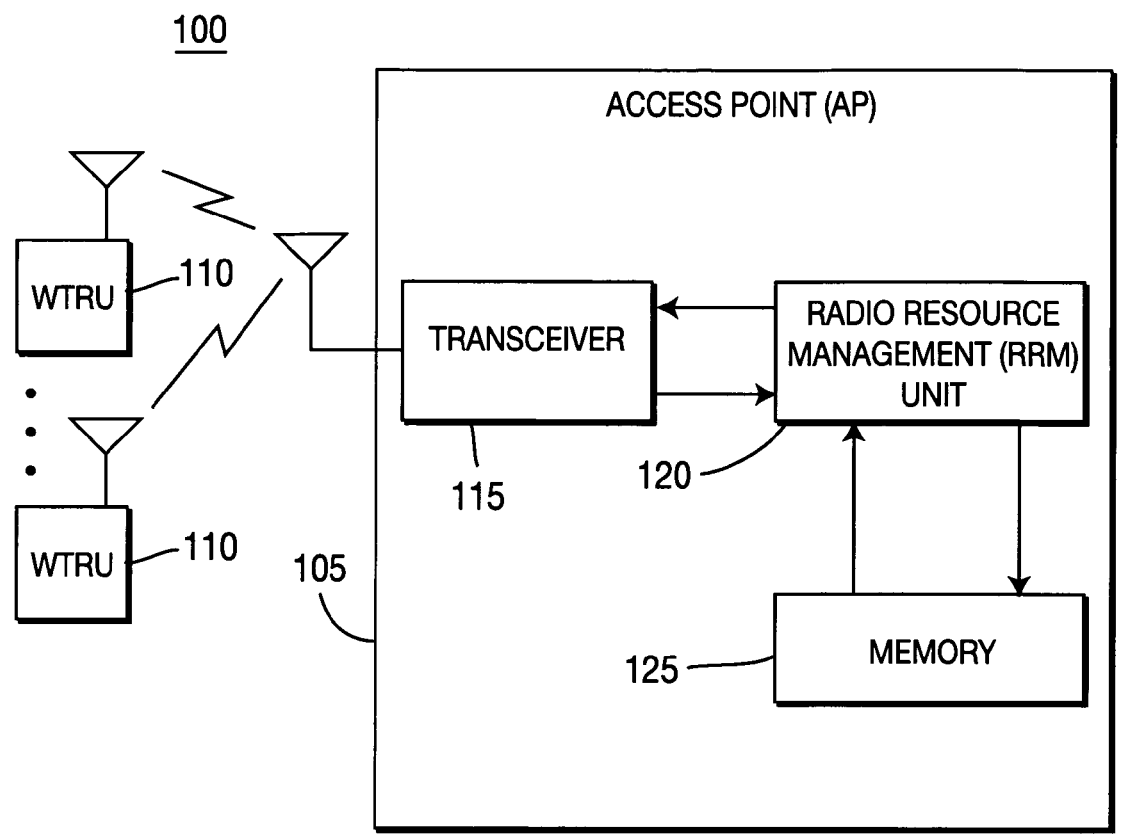
FIG. 1 shows a wireless communication system including a plurality of WTRUs and an AP which uses SMPs to support advanced RRM functions in accordance with a preferred embodiment of the present invention.

FIG. 1 is a wireless communication system which includes an AP 105 in selective communication with a plurality of WTRUs 110. The AP 105 uses SMPs to support advanced RRM functions. The AP 105 includes a transceiver 115, an RRM unit 120 and a memory 125. It should be noted that each of the blocks shown in FIG. 1 is representative of a particular function. Many of these functions may be combined into a single or multiple units. Accordingly, the present invention is not dependent upon the segmentation of functions as shown. Additionally, not all of the functions shown in FIG. 1 are required to implement the present invention, as these functions are illustrated for clarity.

The present invention uses the clear channel assessment (CCA) function, which is specified in the IEEE 802.11 standards. The role of the CCA function of an IEEE 802.11 device, (either an AP or a WTRU), is to indicate when the communication medium is "busy". An IEEE 802.11 device refrains from transmitting when the communication medium is busy. In addition, an idle receiver will attempt to decode an incoming packet when the CCA function starts to indicate that the communication medium is busy.

In the AP 105, the transceiver 115 transmits communications to, and receives communications from, other entities of a wireless communications system, such as the WTRUs 110. Characteristics of signals sent through a radio channel are measured, such as a received signal strength indicator (RSSI) of a received packet, a duration over which the CCA function indicates that the communication medium is busy, or the level of external interference.

In the AP 105, the RRM unit 120 receives information about the contents of decoded packets, such as the source and destination address, the type of packet, or the like. As will be explained in detail hereinafter, the RRM unit 120 provides overall timing control of the operations of the AP 105, including those associated with the SMP. The RRM unit 120 supports all of the typical RRM functions of a wireless device, such as an IEEE 802.11 device, (either as an AP or a WTRU). For example, RRM functions include functions to determine the most appropriate frequency channel to operate on, and the optimal transmission power level and data rate for different packets. RRM functions may also include functions to prevent or manage congestion due to excessive traffic load. The RRM unit 120 is also coupled to the memory 125 which stores the parameters related to the operation of the AP 105, including the ACS and the values used in the calculation of the timers (Table 1).

In the AP 105, the memory 125 includes the ACS, which is defined as the set of channels on which an AP in the Extended Service Set (ESS) is allowed to operate. These channels should be the same for all APs of an ESS. The channels in the ACS will preferably be non-overlapping, but this is not a necessary condition. In general, the ACS could be the set of all possible channels in the frequency band used by the AP. However, all APs preferably have the same ACS, and the ACS will be only a subset of the possible channels of the band.

As explained above, the role of the CCA function is to indicate whether the communication medium is idle or busy. The communication medium is deemed busy if certain conditions, depending on the CCA mode chosen, are met. For example, in one commonly used CCA mode for IEEE 802.11 systems, the communication medium is deemed busy if the received power is above an energy detect threshold (EDT) and if a signal is detected to be generated by an IEEE 802.11 device.

Table 1 summarizes parameters involved in the set up of SMPs as will be explained with reference to FIG. 2. As those of skill in the art would realize, other parameters may be used in addition to, or in place of, these parameters and values.

TABLE 1

| Symbol | Description |
| --- | --- |
| ACS | Allowable Channel Set |
| $T_{mpp\_fix}$ | Fixed component of the Silent Measurement Period generation interval |
| $T_{mpp\_var}$ | Amplitude of the variable component of the Silent Measurement Period generation interval |
| $T_{mp\_dur}$ | Duration of a Silent Measurement Period |

Figure 2:
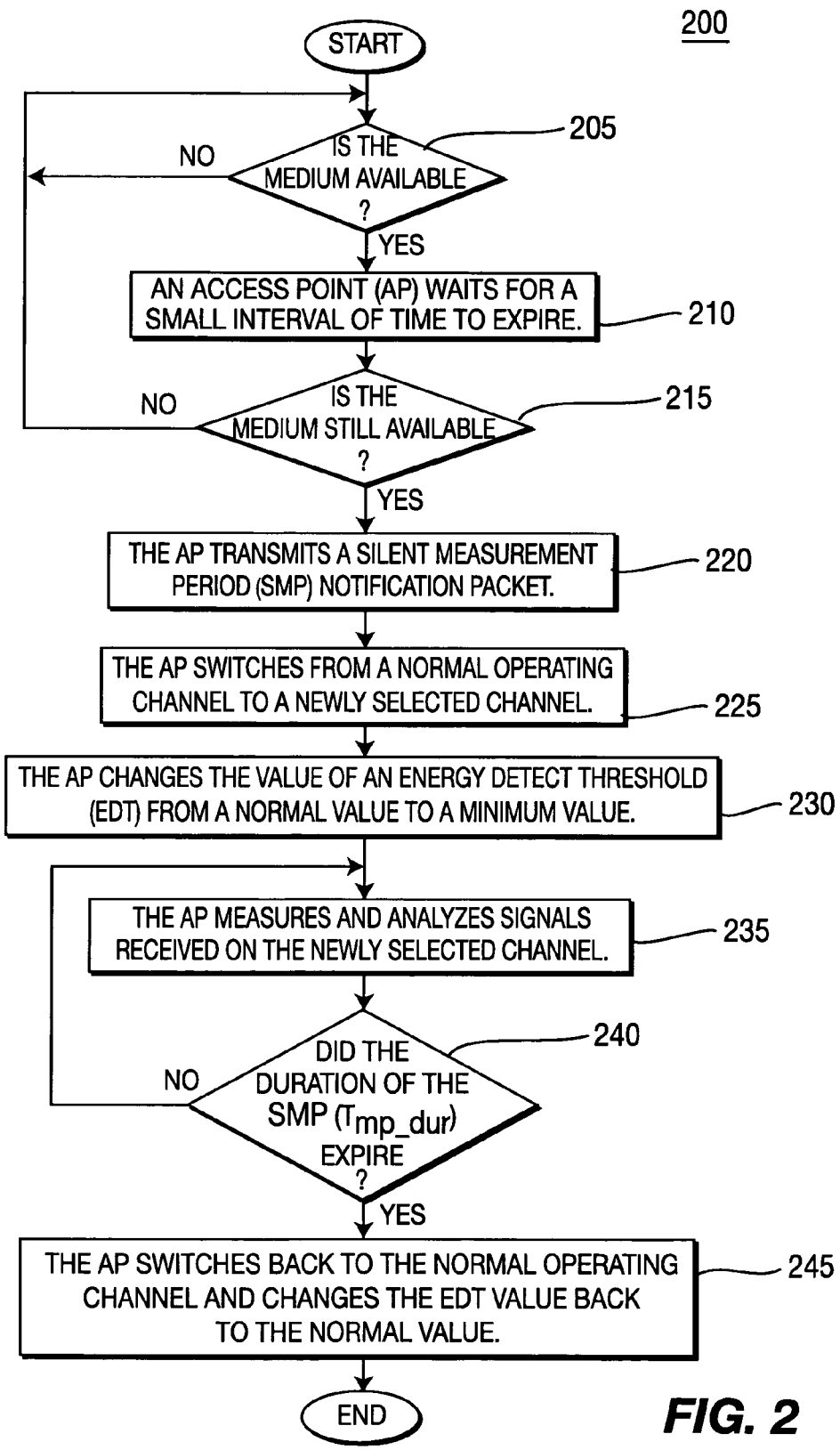
FIG. 2 is a flow diagram of a process implemented in the system of FIG. 1 for changing channels and EDT values during and after the AP transmits an SMP after a communication medium is determined to be available.

FIG. 2 is a flow diagram of a process 200 including method steps for changing channels and EDT values during and after the AP 105 transmits an SMP after a communication medium is determined to be available. The process 200 is activated in response to an SMP being triggered, as will be explained hereinafter with reference to FIG. 3.

Referring to FIG. 2, the AP 105 waits until it is determined that the communication medium becomes available (step 205). Once the communication medium is available, then the AP 105 waits for a short interval of time to expire (step 210), (e.g., a priority interframe space (PIFS)). The short interval may be pre-determined or may be variable or random. The reason for waiting for the short interval to expire in step 210 is to avoid collisions with another packet when transmitting the SMP notification packet. If the communication medium is determined to still be available after the short interval expires (step 215), the process 200 proceeds to step 220. Otherwise, the process 200 returns to step 205 to wait until it is determined that the communication medium is available again. In step 220, the AP 105 transmits an SMP notification packet (step 220). The role of this notification packet is to reduce the probability that a WTRU 110 in the BSS served by the AP 105 transmits a packet during the SMP.

There are several alternatives for implementing the SMP notification packet. In an alternative for implementation in an IEEE 802.11 system, the SMP notification packet may simply consist of a request-to-send (RTS) or a clear-to-send (CTS) packet with a "dummy" destination address, such as the address of the AP 105 itself, reserving the communication medium for a duration $T_{mp\_dur}$. WTRUs 110 receiving the RTS or CTS packet will refrain from transmitting for the duration specified in the packet.

Alternatively, the AP 105 may initiate a contention-free period by transmitting a beacon packet indicating the beginning of a contention-free period of duration $T_{mp\_dur}$. WTRUs 110 receiving this beacon packet will refrain from transmitting during the indicated duration of the contention-free period.

The transmission power of the SMP notification packet implemented using either method is preferably set to a value sufficiently low to avoid WTRUs 110 in neighboring BSSs utilizing the same operating channel as the AP 105 from receiving the SMP notification packet. The reception by such WTRUs 110 would prevent the WTRUs from transmitting, which could impair the ability of the SMP to estimate the channel utilization in neighboring BSSs on the same channel.

Referring still to FIG. 2, the AP 105 switches from a normal operating channel to a newly selected channel (step 225), (if necessary). The newly selected channel is a channel on which the data packets from other BSSs will be sent. In step 230, the AP 105 changes the value of an EDT from a normal value to a minimum value. This ensures that the AP 105 can listen to packets received at power levels as low as possible.

The AP 105 measures and analyzes received signals on the newly selected channel (step 235). Measurements may include, but are not limited to: the duration of received packets; the RSSI of received packets; the duration over which the CCA function indicates that the communication medium is available or busy; external interference levels; or the like. While measuring the characteristics of received packets, the AP 105 determines whether the duration of the SMP ($T_{mp\_dur}$) has expired (step 240). If the duration of the SMP ($T_{mp\_dur}$) has not expired, the AP 105 continues to measure and analyze received signals on the newly selected channel in step 235. If the AP 105 determines in step 240 that the period of the SMP ($T_{mp\_dur}$) has expired, the AP 105 switches back to the normal operating channel (if different), and the value of the EDT is changed back to the normal value, (i.e., the value prior to the SMP) (step 245).

Figure 3:
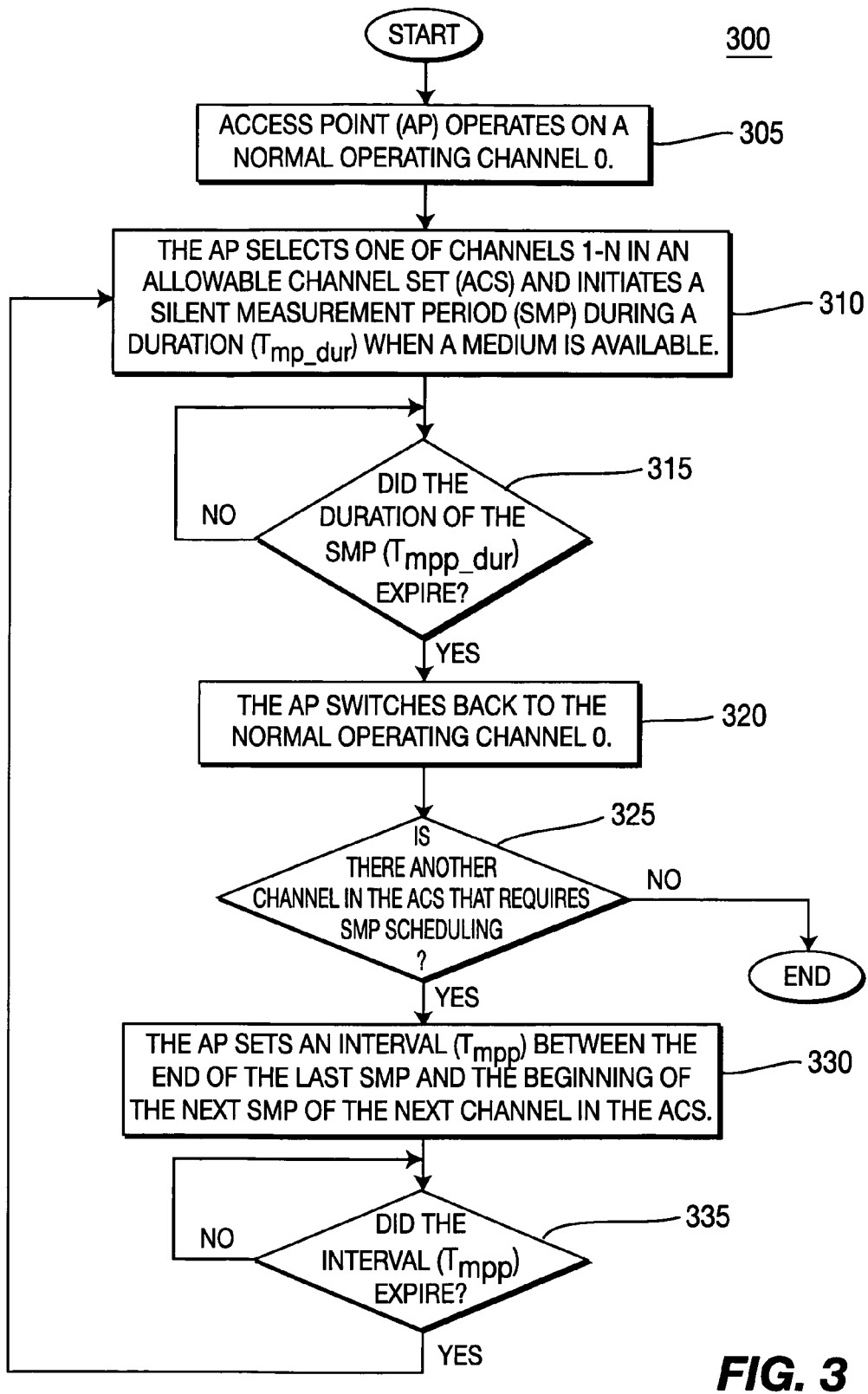
FIG. 3 is a flow diagram of a process implemented in the system of FIG. 1 for managing radio resources using SMPs for a plurality of channels in an ACS.
Figure 4:
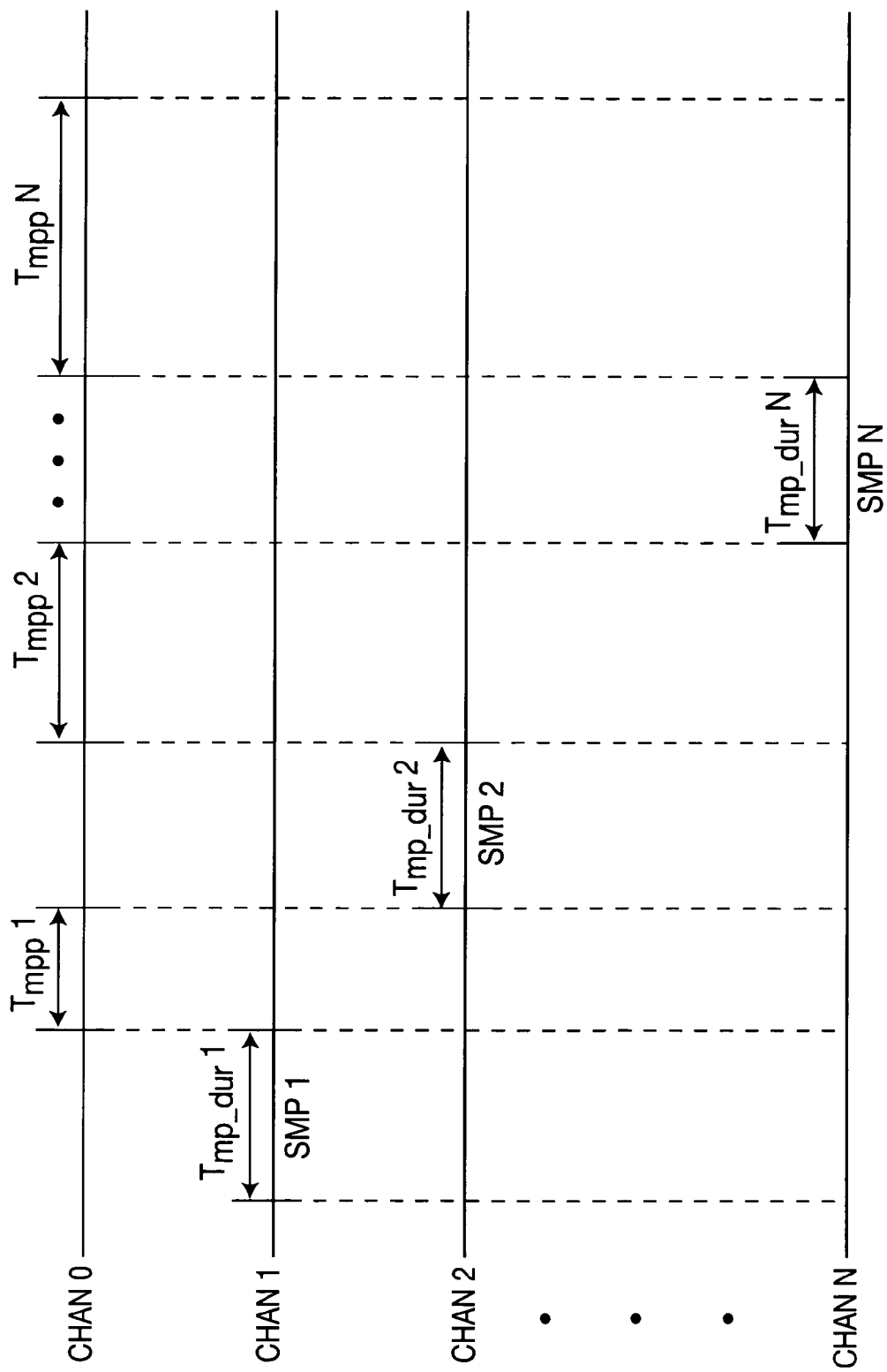
FIG. 4 is a timing diagram of the process of FIG. 3.

Scheduling SMPs for all channels in the ACS will now be explained with reference to both FIGS. 3 and 4. FIG. 3 is a flow diagram of a process 300 including method steps for efficiently managing radio resources using SMPs for a plurality of channels in the ACS according to the present invention. FIG. 4 is a timing diagram associated with the process 300.

As described while referring to FIG. 2, it should be noted that the AP 105 operates on a particular (normal) operating channel, switches to another channel during the SMP (if necessary), and then switches back to the particular operating channel after the SMP (if different). For the purposes of the present example, the operating channel of the AP 105 will be illustrated as channel 0, (CHAN 0), although just an arbitrary sending channel could be utilized.

Referring to FIGS. 3 and 4, in step 305, the AP 105 operates on a normal operating channel 0 of an ACS. In step 310, the AP 105 selects one of channels 1-N, (CHAN 1-CHAN N), in the ACS and initiates an SMP during a duration ($T_{mp\_dur}$) when a communication medium is available, as shown in FIG. 4 by $T_{mpdur}1$ of SMP 1. In step 315, the AP 105 determines whether the duration of the SMP ($T_{mp\_dur}$) has expired and, if so, the AP 105 switches back to the normal operating channel 0, (CHAN 0), in step 320. If, in step 325, the AP 105 determines that there is another channel in the ACS that requires SMP scheduling, the AP 105 sets an interval ($T_{mpp}$) between the end of the previous SMP (SMP1) and the beginning another SMP (SMP2) of the next channel in the ACS, (CHAN 2), as shown in FIG. 4 by $T_{mpp}$ 1 and SMP 2.

The interval $T_{mpp}$ set by the AP 105 may be a constant period, but is preferably a variable period as determined by Equation 1:

$$T_{mpp} = T_{mpp\_fix} + C \times T_{mpp\_var};\qquad \text{Equation (1)}$$

where $T_{mpp\_fix}$ and $T_{mpp\_var}$ are fixed values, and C is a variable between −1 and 1. $T_{mpp\_fix}$ is the approximate "periodicity" of the SMP occurrences. $T_{mpp\_var}$ is the amplitude of a random "jitter" that prevents the SMP occurrences from happening regularly. Preferably, $T_{mpp\_var}$ is much smaller than $T_{mpp\_fix}$. This is not required since the SMP may be periodic. However, implementing it in a non-periodic manner reduces the risk that the measurements made during an SMP are in-sync with some traffic patterns in the measured BSSs, which could result in some estimation bias. Thus, the interval between SMPs can be different according to the value of $T_{mpp}$. As shown in FIG. 4, $T_{mpp}$ 1 is smaller than $T_{mpp}$ 2, and $T_{mpp}$ N, (for the $N_{th}$ SMP), is larger than $T_{mpp}$ 2. The length of the interval $T_{mpp}$ varies as the periods change in accordance with Equation 1.

Because the AP 105 cannot serve its own WTRUs 110 during an SMP, the overall fraction of time used for the SMP, (that is $\Sigma T_{mp\_dur} N/(\Sigma T_{mpp} N + \Sigma T_{mp\_dur} N))$, should be very small. The overall fraction of time for the SMP is a tradeoff between limiting the loss of time for an AP's own transmissions and allocating sufficient time for measurements on other BSS's transmissions.

In setting the fraction, support for voice loads are considered since voice communications are very sensitive to delay jitter. This imposes a maximum limit on the duration of a single SMP ($T_{mp\_dur}$). On the other hand, a single SMP must be of a long enough duration to allow the reception of full packets from neighboring BSSs with a reasonable probability of success.

In step 335, the AP 105 determines whether the interval ($T_{mpp}$) expired and, if it did, the process returns to step 310 where another channel is selected from the ACS, (CHAN 2). Steps 330, 335, 310, 315 and 320 are continually repeated, as shown in FIG. 4 by $T_{mp\_dur}$ 2 of SMP 2, . . . , $T_{mp\_dur}$ N of SMP N, and $T_{mpp}$ 2, . . . , $T_{mmp}$ N, until it is determined in step 325 that there are no further channels in the ACS that require SMP scheduling.

By performing this process, all SMPs are set for all channels in the ACS. As shown in FIG. 4, SMPs may be set up for all channels in the ACS in a cyclical manner. Thus, after the AP 100 operates SMPN for the Nth channel in the ACS, the AP 100 starts another new cycle of SMP operation from the 1st channel in the ACS. It should be noted that the operating channel of the AP is normally part of the ACS, so the AP will schedule an SMP for its own operating channel from time to time. Additionally, the SMPs may be set up for all channels in the ACS in a random order.

It should also be noted that the actual duration between SMPs may not be exactly $T_{mpp}$ N because the communication medium might be busy at the expiration of the timer, forcing the AP 105 to wait a little longer before transmitting the SMP notification packet as described above.

Although the features and elements of the present invention are described in the preferred embodiments in particular combinations, each feature or element can be used alone (without the other features and elements of the preferred embodiments) or in various combinations with or without other features and elements of the present invention.

While this invention has been particularly shown and described with reference to a preferred embodiment, it will be understood by those skilled in the art that various changes in form and details may be made therein without departing from the scope of the invention as described hereinabove.

What is claimed is:

1. A method for managing radio resources of an access point (AP), the method comprising:
    operating on a first channel of an allowable channel set (ACS);
    transmitting a notification packet to initiate a silent measurement period (SMP) when the AP determines that a communication medium is idle, the packet indicating a duration of the SMP;
    selecting a channel from the ACS and switching from the first channel to the selected channel;
    analyzing signals received on the selected channel to measure interference on the selected channel; and
    switching back to the first channel when the duration of the SMP expires.

2. The method of claim 1 further comprising:
    changing the setting of an energy detect threshold (EDT) from a normal value to a minimum value after the SMP is initiated; and
    changing the EDT value back to the normal value when the duration of the SMP expires.

3. The method of claim 1 wherein the AP serves a coverage area defined by a first basic service set (BSS) of a plurality of BSSs.

4. The method of claim 3 wherein the AP does not serve the coverage area during the duration of the SMP.

5. The method of claim 3 wherein the AP analyzes signals received from at least one BSS of the plurality of BSSs other than the first BSS.

6. The method of claim 1 further comprising:
    determining whether there is another channel in the ACS that requires interference measurement; and
    if there is at least one channel that requires interference measurement, repeating the method starting with the transmitting.

7. The method of claim 1 wherein the AP waits for an interval before sending the SMP notification packet and transmits the SMP notification packet only if the communication medium is available at the end of the interval.

8. An access point (AP) for managing radio resources, comprising:
    a memory for storing an allowable channel set (ACS);
    a transceiver for transmitting and receiving a packet; and
    a radio resource management (RRM) unit in communication with the transceiver and the memory and configured to transmit a notification packet to initiate a silent measurement period (SMP), the notification packet indicating a duration of the SMP during which no wireless transmit/receive unit (WTRU) associated with the AP attempts transmission to the AP, the RRM unit configured to switch a channel from a current operating channel to one of the channels in the ACS at the initiation of the SMP to measure interference on the channel and to switch back to the current operating channel when the duration of the SMP expires.

9. The access point of claim 8 wherein the RRM unit is configured to change a setting of an energy detect threshold (EDT) from a normal value to a minimum value during and after initiation of the SMP, and to change the EDT value back to the normal value when the duration of the SMP expires.

10. The AP of claim 8 wherein the resource management unit is configured to wait an interval before sending the SMP notification packet and to transmit the SMP notification packet only if the communication medium is available at the end of the interval.

11. The AP of claim 8 wherein the resource management unit is configured to transmit a new notification packet to initiate a new SMP and to switch to a new channel in the ACS at the initiation of the new SMP to measure interference on the new channel if the AP determines that the new channel requires interference measurement.

12. An integrated circuit (IC) for managing radio resources, the IC comprising:
   a memory for storing an allowable channel set (ACS);
   a transceiver for transmitting and receiving a packet; and
   a resource management unit in communication with the transceiver and the memory and configured to transmit a notification packet to initiate a silent measurement (SMP), the notification packet indicating a duration of the SMP, the resource management unit configured to switch a channel from a current operating channel to one of the channels in the ACS at the initiation of the SMP to measure interference on the channel and to switch back to the current operating channel when the duration of the SMP expires.

* * * * *